United States Patent
Young

(10) Patent No.: US 8,155,518 B2
(45) Date of Patent: Apr. 10, 2012

(54) DYNAMIC LOAD BALANCING OF FIBRE CHANNEL TRAFFIC

(75) Inventor: Howard Young, Thousand Oaks, CA (US)

(73) Assignee: LSI Corporation, Milpitas, CA (US)

( * ) Notice: Subject to any disclaimer, the term of this patent is extended or adjusted under 35 U.S.C. 154(b) by 582 days.

(21) Appl. No.: 12/414,217

(22) Filed: Mar. 30, 2009

(65) Prior Publication Data

US 2010/0247094 A1 Sep. 30, 2010

(51) Int. Cl.
*H04B 10/08* (2006.01)
*H04J 14/00* (2006.01)
*G01R 31/08* (2006.01)

(52) U.S. Cl. ............... 398/25; 398/45; 398/66; 370/230; 370/231

(58) Field of Classification Search ............... 398/25, 398/45, 66; 370/230–231, 422, 392, 335, 370/235, 389
See application file for complete search history.

(56) References Cited

U.S. PATENT DOCUMENTS

| | | | |
|---|---|---|---|
| 6,532,212 B1 | 3/2003 | Soloway et al. | |
| 6,625,241 B2 | 9/2003 | Mejia | |
| 6,766,463 B1 | 7/2004 | Hadley | |
| 7,058,758 B2 | 6/2006 | Allen et al. | |
| 7,307,948 B2 | 12/2007 | Infante et al. | |
| 7,881,325 B2 * | 2/2011 | Cheethirala et al. | 370/422 |
| 2002/0012342 A1 | 1/2002 | Oldfield et al. | |
| 2004/0085994 A1 | 5/2004 | Warren et al. | |
| 2005/0259632 A1 | 11/2005 | Malpani et al. | |
| 2006/0153187 A1 | 7/2006 | Agrawal et al. | |
| 2006/0203725 A1 | 9/2006 | Paul et al. | |

* cited by examiner

*Primary Examiner* — Dawayne A Pinkney
(74) *Attorney, Agent, or Firm* — Duft Bornsen & Fishman LLP

(57) ABSTRACT

Systems and methods herein provide for load balancing Fiber Channel traffic. In this regard, a Fiber Channel load balancer may be operable to monitor Fiber Channel paths coupled to a host bus adapter and determine the speeds of the Fiber Channel ports within the Fiber Channel paths. The Fiber Channel load balancer may also be operable to determine certain characteristics of the Fiber Channel traffic being passed over the Fiber Channel paths. For example, a load balancer may determine Fiber Channel traffic sizes of pending requests and, based in part on the traffic sizes and operable normalized speeds of the Fiber Channel ports, adaptively route the pending original traffic across the Fiber Channel ports.

11 Claims, 3 Drawing Sheets

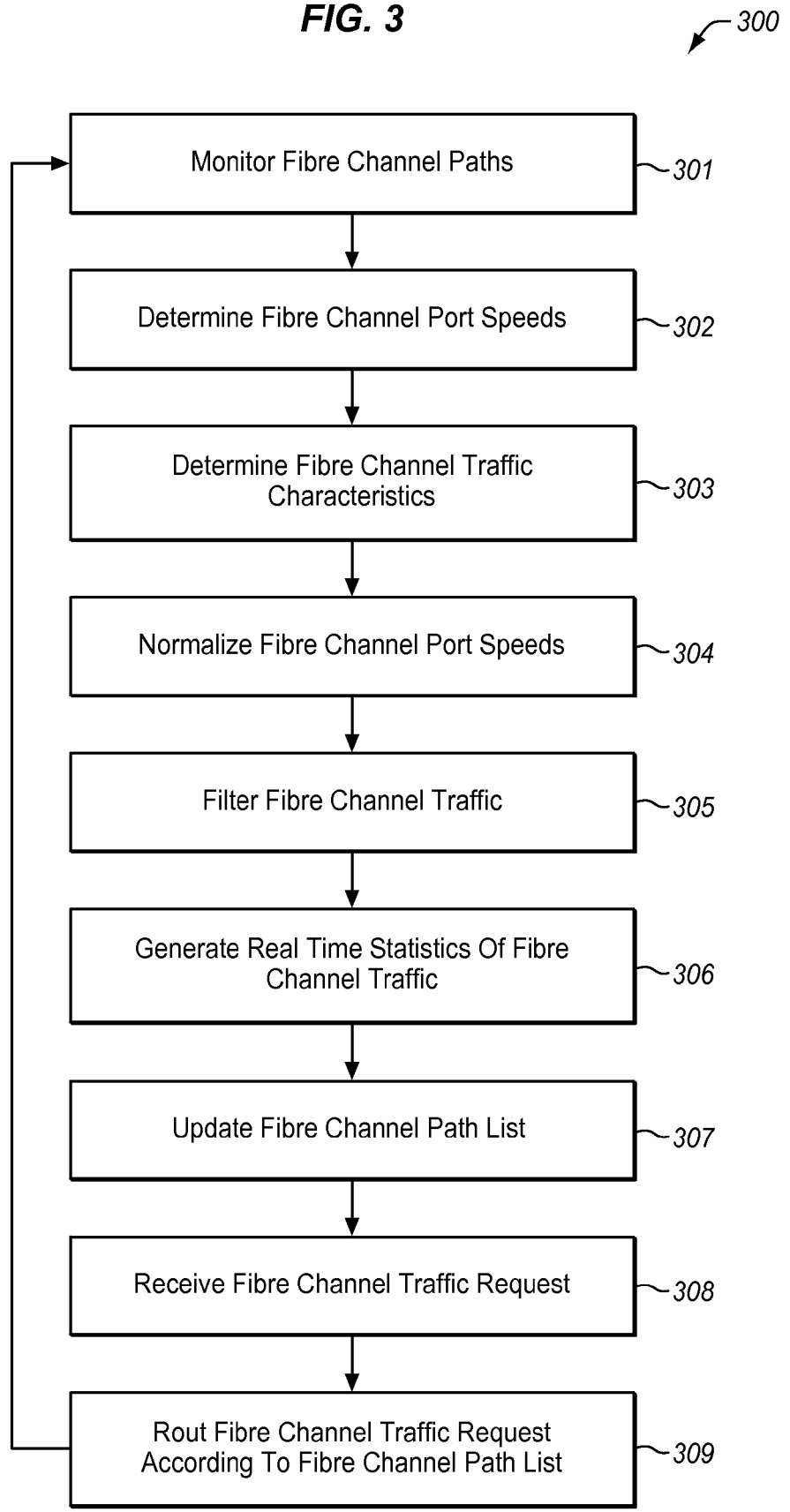

DYNAMIC LOAD BALANCING OF FIBRE CHANNEL TRAFFIC

BACKGROUND

1. Field of the Invention

The invention generally related to Fibre Channel load balancing and more particularly to the dynamic allocation of Fibre Channel traffic across multiple Fibre Channel paths.

2. Discussion of the Related Art

Fibre Channel is a gigabit-speed network technology used in storage networking. Fibre Channel is standardized in the T11 Technical Committee of the International Committee for Information Technology Standards (INCITS). Fibre Channel has become a standard connection type for storage area networks (SAN) in enterprise storage. Despite common connotations of its name, Fibre Channel signaling can run on both twisted pair copper wire and fiber-optic cables. For example, the Fibre Channel Protocol is a transport protocol similar to TCP used in IP networks which predominantly transports SCSI commands over Fibre Channel networks using various types of communication lines.

Advantages of Fibre Channel include high performance and exceptionally high data speeds, generally operating at 1, 2, 4, 8, 10, and 20 gigabits per second with relatively low noise, although other data speeds are anticipated. Additionally, fiber optic technology overcomes traditional input/output (I/O) channel distance limitations at gigabit speeds. Fibre Channel is also more lightweight than bulky copper cables and is operable to transport a wide variety of protocols.

Fibre Channel supports three different topologies, point-to-point, fabric attached, and arbitrated loop. The point-to-point topology is the simplest topology that attaches two devices directly. The fabric attached topology attaches a device directly to a "fabric". In this regard, devices or loops of devices are connected to Fibre Channel switches, conceptually similar to modern Ethernet implementations. The arbitrated loop topology attaches devices in a loop, or "ring", similar to token ring networking. Adding or removing a device from the loop causes activity on the loop to be interrupted. Furthermore, a failure of one device causes a break in the ring. Thus, Fibre Channel hubs exist with "failover" links such that failed ports may be bypassed.

In the arbitrated loop topology, up to 126 devices and one connection to a fabric switch may exist in a single arbitrated loop physical address space. Data within an address space physically travels from node to node in a daisy-chain fashion, ultimately traveling in a loop. Control by a device on the loop is obtained through the process of loop arbitration, after which the device winning arbitration sends data. In a half duplex mode, only one device transfers data at any point in time. In a full duplex mode, two devices may communicate with each other at the same time over a single interconnective segment of the loop. In the absence of load balancing, Fibre Channel traffic is generally handled on a "first-come first-served" queuing.

Fibre Channel communications, however, are often configured in a plurality of Fibre Channel loops. For example, a single Fibre Channel arbitrated loop may be configured with multiple devices that communicate through the loop with a host computer. This topology can be extended by way of a host bus adapter that connects multiple loops to the host computer such that the host computer may communicate with each Fibre Channel loop and the devices thereof. While this topology provides the host computer with more resources, these resources typically have competing interests that require some form of load balancing.

In computing, load balancing is a technique that spreads work around processing nodes (e.g., computers, network links, CPUs, hard drives, etc.) in order to maximize throughput and minimize response time. An example of one such technique employed in Fibre Channel communications includes a "Round Robin" technique that attempts to balance I/O requests across multiple paths by sequentially selecting the paths for each I/O request. In this regard, a multiplexer, switch, or router may employ a round-robin scheduling algorithm using a separate queue for every data flow with each being identified by its source and destination address. The scheduling algorithm allows every active data flow having data packets in queue to take turns transferring packets on a shared channel in a periodically repeated order.

Over time, each path in a Round Robin scheduling supposedly has an average utilization. However, this type of scheduling does not take into consideration other factors that affect load balancing. For example, Round Robin scheduling algorithms do not account for variations in the operation or configurations of multiple paths.

SUMMARY

The present invention solves the above and other problems, thereby advancing the state of the useful arts, by providing methods and structure for load balancing Fibre Channel traffic. In this regard, a Fibre Channel load balancer may be operable to monitor Fibre Channel paths coupled to a host bus adapter and determine the speeds of the Fibre Channel ports within the Fibre Channel paths. The Fiber Channel load balancer may also be operable to determine certain characteristics of the Fibre Channel traffic being passed over the Fibre Channel paths. For example, a load balancer may determine Fibre Channel traffic sizes of pending requests and, based in part on the traffic sizes and operable normalized speeds of the Fibre Channel ports, adaptively route the pending original traffic across the Fibre Channel ports. In this regard, the load balancer takes into consideration multiple transfer speeds that exist among differing Fibre Channel paths as well as the direction of Fibre Channel traffic (e.g., received traffic or transmitted traffic).

In one embodiment, a Fibre Channel load balancer is coupled to a plurality of Fibre Channel paths and includes a detector operable to monitor Fibre Channel traffic across the Fibre Channel paths and identify Fibre Channel traffic characteristics and Fibre Channel path characteristics. The Fibre Channel load balancer also includes path selection logic operable to adaptively select the Fibre Channel paths for routing the Fibre Channel traffic based on the Fibre Channel traffic characteristics and the Fibre Channel path characteristics to balance the Fibre Channel traffic across the Fibre Channel paths. The path selection logic is further operable to periodically update a list of the Fibre Channel paths from which the path selection logic adaptively selects the Fibre Channel paths to balance the Fibre Channel traffic across the Fibre Channel paths.

The Fibre Channel path characteristics may include speeds of the Fibre Channel paths. The Fibre Channel traffic may include header information indicating a size of the Fibre Channel traffic and the detector may be further operable to detect the size of the Fibre Channel traffic for use by the path selection logic. The Fibre Channel traffic may include both received and transmitted Fibre Channel traffic and wherein the detector is further operable to integrate said received and transmitted Fibre Channel traffic for use by the path selection logic in adaptively selecting the Fibre Channel paths. The Fibre Channel traffic may include both received and transmitted Fibre Channel traffic and the detector may be further operable to integrate the received and transmitted Fibre Channel traffic for use by the path selection logic in adaptively selecting the Fibre Channel paths The detector may also be further operable to normalize the speeds of the Fibre Channel paths. The detector may further include a filter operable to filter the Fibre Channel traffic and generate a statistical model of the Fibre Channel traffic for input to the path selection logic. The path selection logic may be further operable to adaptively select the Fibre Channel paths for routing the Fibre Channel traffic based on the generated statistical model. The filter may also be communicatively coupled to a port speed normalizer that is used to normalize the speeds of the Fibre Channel paths to perform a moving exponential average of the Fibre Channel traffic after normalizing the speeds.

In another embodiment, a method of routing Fibre Channel traffic includes monitoring Fibre Channel traffic over a plurality of Fibre Channel paths, detecting characteristics of the Fibre Channel traffic, and adaptively routing the Fibre Channel traffic over the Fibre Channel paths based on the Fibre Channel traffic characteristics.

In another embodiment, a computer program product including a computer readable medium embodying a computer readable program for balancing Fibre Channel traffic across a plurality of Fibre Channel paths. The computer readable program when executed on a computing device causes the computing device to perform the steps of monitoring the Fibre Channel traffic over the Fibre Channel paths, detecting sizes of the Fibre Channel traffic, detecting speeds of the Fibre Channel paths, and normalizing the speeds of the Fibre Channel paths. The computer readable program also causes the computing device to perform the step of adaptively routing the Fibre Channel traffic over the Fibre Channel paths based on the Fibre Channel traffic sizes and the speeds.

BRIEF DESCRIPTION OF THE DRAWINGS

FIG. 3 is a flowchart of an exemplary process for load balancing a plurality of Fibre Channels.

DETAILED DESCRIPTION OF THE DRAWINGS

FIGS. 1-4 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
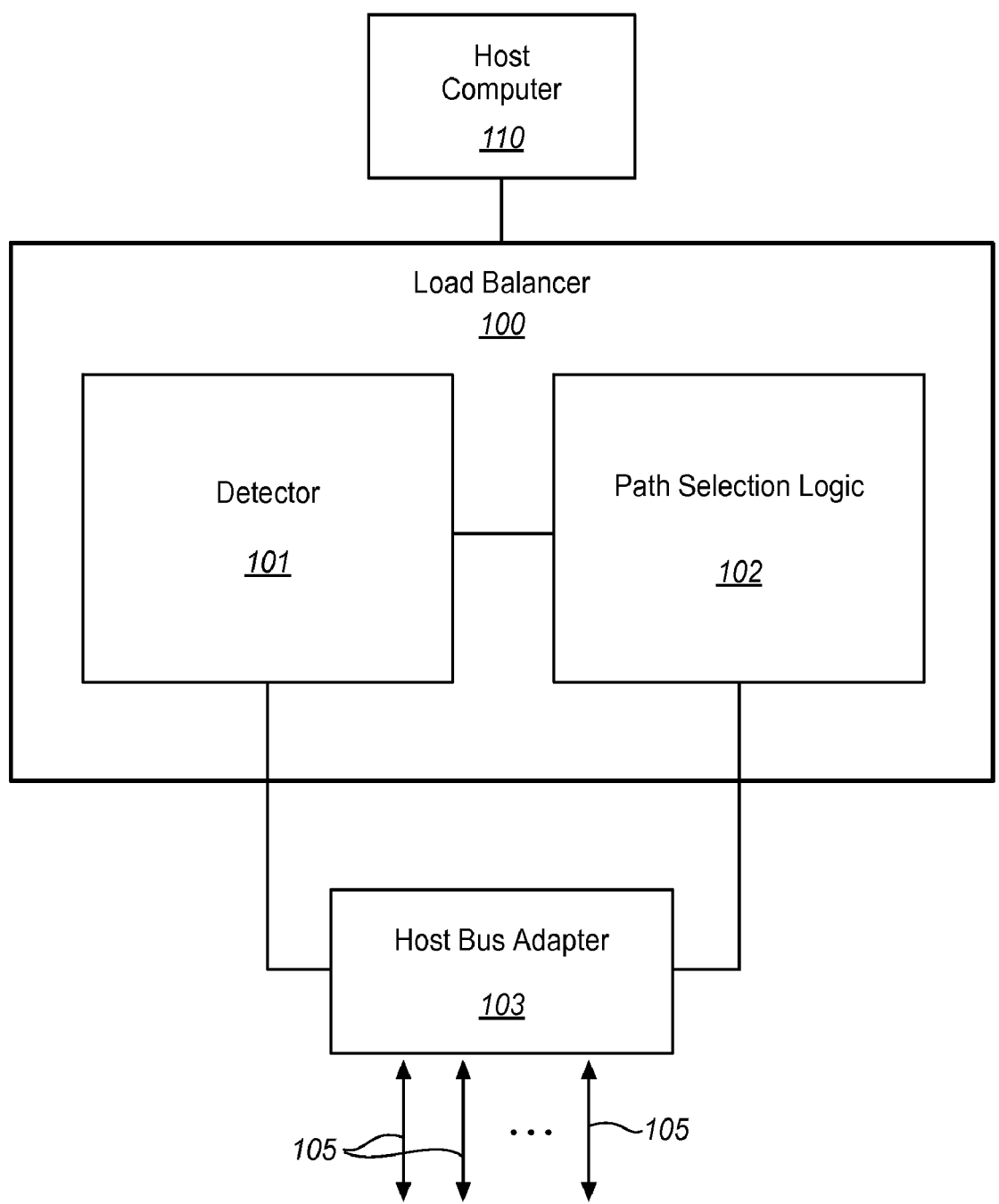
FIG. 1 is a block diagram of an exemplary Fibre Channel load balancer.

FIG. 1 is a block diagram of an exemplary Fibre Channel load balancer 100. The load balancer 100 is coupled to a plurality of Fibre Channel paths 105 through a host bus adapter 103. The load balancer 100, as the name implies, is operable to balance data transfers among the Fibre Channel paths 105 such that certain paths are not underutilized or overutilized as these conditions may affect device utilization, reduce data throughput, and/or increase response time. The load balancer 100 does so by dynamically, or "adaptively", balancing both receive and transmit Fibre Channel traffic across the Fibre Channel paths 105 based on statistical analysis of the traffic over the Fibre Channel paths.

The host bus adapter 103 is typically configured as a Fibre Channel interface card that is accessible via a host computer's operating system such that the host computer 110 may communicate with a plurality devices (e.g., storage devices of a storage area network) that are communicatively coupled to the Fibre Channel paths 105. In this regard, a hardware implementation of the load balancer 100 may have the load balancer being configured with the Fibre Channel interface card along with the host bus adapter 103. However, the invention is not intended to be limited to any particular configuration as the load balancer 100, and for that matter the host bus adapter 103, may be configured in hardware, software, firmware, or combinations thereof within or external to the host computer 110.

As mentioned previously, each Fibre Channel path 105 is generally operable to transfer data at a speed of 1, 2, 4, 8, or 10 gigabits per second. The host bus adapter 103 is therefore operable to connect the host computer 110 according to the data speeds of the Fibre Channel paths 105. For example, a first Fibre Channel path 105 may operate at a speed of 1 gigabits per second while a second Fibre Channel path 105 operates at a speed of 2 gigabits per second. The host bus adapter 103 is, therefore, operable to transfer data between a device and the host computer 100 over the first Fibre Channel path 105 at 1 gigabits per second and between another device over the second Fibre Channel path 105 at 2 gigabits per second.

Each Fibre Channel path 105 is illustrated as a duplex communication link. In this regard, each Fibre Channel path 105 comprises two "L-ports", one for receiving data and the other for transmitting data. Each port is capable of operating at a Fibre Channel path speed (e.g., 1, 2, 4, 8, or 10 gigabits per second). Fibre Channel ports, such as L-ports, and Fibre Channel configurations in general are known to those skilled in the art.

To implement the adaptive load balancing of both receive and transmit traffic across the Fibre Channel paths 105, the load balancer 100 is configured with a detector 101 that is operable to monitor the Fibre Channel paths 105 and identify Fibre Channel traffic and path characteristics. For example, the detector 101 may analyze each of the Fibre Channel paths 105 to determine the port speeds of both the receive Fibre Channel traffic and transmit Fibre Channel traffic. The detector 101 may also determine the amount of traffic being received and transmitted over the Fibre Channel paths 105. In this regard, the detector 101 may generate certain statistics regarding the traffic being conveyed across the Fibre Channel paths 105. These statistics may then be used to route and/or re-route traffic across the various Fibre Channel paths 105, and their respective ports.

To route/reroute the Fibre Channel traffic across Fibre Channel paths 105, the load balancer 100 is also configured with path selection logic 102 that is operable to adaptively select the Fibre Channel paths for the Fibre Channel traffic based on the Fibre Channel traffic and the path characteristics. This Fibre Channel adaptive path selection is regularly updated to balance the Fibre Channel traffic across the Fibre Channel paths. For example, parameters from the detector 101 used by the path selection logic 102 to perform the path selection of the Fibre Channel traffic may be updated at some periodic time interval (e.g., once per second) to ensure that the traffic across the Fibre Channel paths 105 remains balanced.

Figure 2:
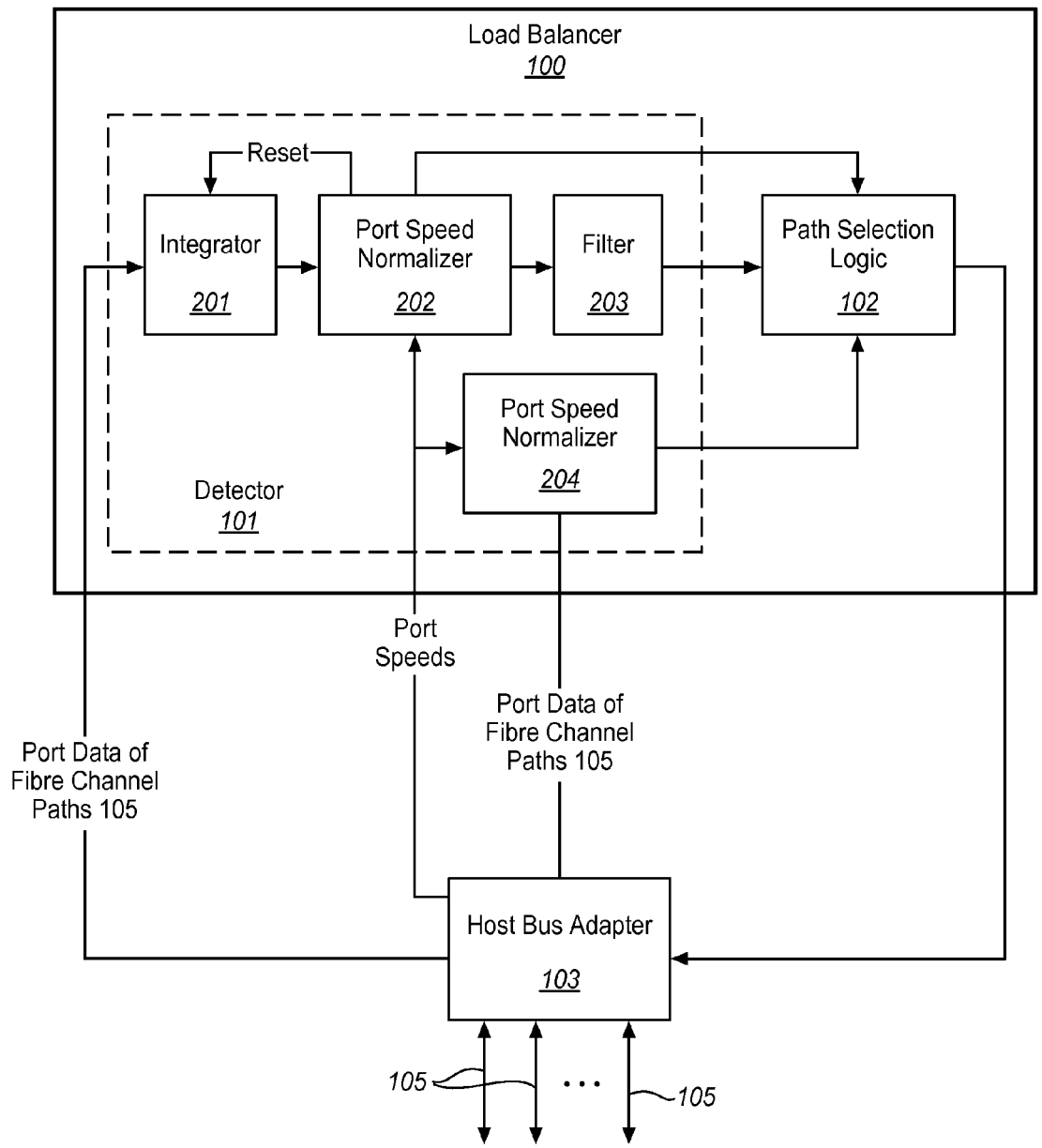
FIG. 2 is another block diagram of the exemplary Fibre Channel load balancer.

FIG. 2 is another exemplary block diagram of the Fibre Channel load balancer 100. In this embodiment, the detector 101 of the load balancer 100 is configured with a plurality of modules that assist in the statistical determination of the Fibre Channel traffic such that the path selection logic 102 may adaptively respond to the routing of the Fibre Channel traffic across the Fibre Channel paths 105. In this regard, the detector 101 may include an integrator 201 that is operable to monitor the receive port and the transmit port for each of the Fibre Channel paths 105 and determine the shape of the traffic being conveyed. For example, the integrator 201 may determine the amount, or size, of both receive Fibre Channel traffic and transmit Fibre Channel traffic for each of the Fibre Channel paths 105.

The detector 101 may also include a port speed normalizer 202 that is operable to normalize the transmitted and received Fibre Channel traffic across the ports of the Fibre Channel paths 105. To illustrate, the previous example of first and second Fibre Channel paths 105 operating at respective speeds of 1 and 2 gigabits per second is used. The port speed normalizer 202 receives inputs from the host bus adapter 103 for the first and second Fibre Channel paths 105 and determines that the speeds are 1 and 2 gigabits per second, respectively. The port speed normalizer 202 subsequently normalizes the traffic for each port of the first and second Fibre Channel paths 105 to the traffic of the 1 gigabits per second Channel path 105. This description, however, is not intended to limit the invention to a particular port speed of the Fibre Channel paths or any normalization thereof. For example, the Fibre Channel paths 105 may have any combination of port speeds used in Fibre Channel communications. The port speed normalizer 202 may simply normalize the traffic across the higher port speed(s) Fibre Channel paths 105 to the lowest port speed Fibre Channel path 105 connected to the host bus adapter 103. Alternatively or additionally, the port speed normalizer may normalize the traffic to the lowest port speed being used. For example, where the first and second Fibre Channel paths 105 may be operating at 1 and 2 gigabits, respectively, another Fibre Channel path may be operating at 8 gigabits per second. However, the host bus adapter 103 may only require conveying traffic across the 2 and 8 gigabits per second Fibre Channels. Accordingly, the port speed normalizer 202 normalizes the 2 and the 8 gigabits per second Fibre Channel to the lower 2 gigabits per second Fibre Channel speed.

The port speed normalizer 202 outputs to the path selection logic 102 such that the path selection logic 102 may use the port speed normalization information as a direct input to the path selection calculations. For example, direct input of port speed normalization for the transmit and receive ports of the Fibre Channel paths 105 provides the path selection logic 102 with a real-time insight as to how the ports are being utilized. Such information may be used to determine a point in time in which a particular port of the Fibre Channel paths 105 should be used for subsequent traffic. The output of the port speed normalizer 202 may also be used to provide certain statistical information to the path selection logic 102. For example, the port speed normalizer 202 may output to the filter 203 such that the filter may provide a moving exponential average for each port of the Fibre Channel paths 105. Thus, with the host bus adapter 103 coupled to eight Fibre Channel paths 105, the port speed normalizer 202 may provide 16 averages accounting for the transmit and receive ports of the Fibre Channel paths 105. The filter 203 may also provide a standard deviation for each computed average. Such information may be useful in accounting for certain abnormal transmit/receive conditions. For example, brief periods of transmit/receive port over utilization may occur. However, these brief periods of over utilization may not require the rerouting of traffic as they will not substantially interfere with the overall Fibre Channel traffic conveyance and/or response times of devices. Accordingly, these brief periods of over utilization may be discounted in the path selection calculations by the path selection logic 102. In one embodiment, the filter 203 is a first order filter that is based on a power of two such that fixed point arithmetic may be used and even implemented in an application specific integrated circuit. The port speed normalizer 202 may also be used as a reset function for the integrator 201. For example, the port speed normalizer 202 may be used to establish the sample rate for integration of the transmit/receive traffic by the integrator 201 and thus the refresh rate of the path selection. That is, the refresh rate of path selection computations by the path selection logic 102 may be based on the sample rate of the load balancer 100.

The load balancer 100 also includes another port speed normalizer 204. The port speed normalizer 204 receives non-integrated Fibre Channel traffic directly from the host bus adapter 103 as well as port speeds of the various ports of the Fibre Channel paths 105. The port speed normalizer 204 normalizes the Fibre Channel traffic to a particular Fibre Channel speed as described above. The normalized port speed is then transferred to the path selection logic 102 for use in the path selection computations. In this regard, the path selection logic 102 may return a set of paths based on, e.g., 90% confidence in predicting the correct path with the least amount of usage. In other words, the path selection logic 102 may sort in ascending order the ports according to $P+(1.645*\sigma)/2*n$, where P is the average port usage, $\sigma$ is the standard deviation of the port usage as determined by the filter 203, and 2 is an integer greater than 1 such that fixed-point arithmetic may be used.

However, the preferred set of paths may be adjusted in real-time since the computation of averages and standard deviations occurs once per second while additional data is being transmitted and received. Thus, to prevent over saturation of the paths with the least amount of usage, an adaptive feedback of transmit and receive bytes may be used to adjust an average estimate derived from the filter 203. The transmit and receive bytes may then be normalized by 1/(port speed) to maintain the same normalization ratio as the input transmit and receive bytes into the filter 203. The number of normalized bytes may be added and accumulated to the average usage for a given transmit and receive port. The new accumulated value and confidence level may result in the path selection logic 102 reordering the set of ports with different path selections.

FIG. 3 is a flowchart of an exemplary process 300 for load balancing a plurality of Fibre Channels, such as Fibre Channels 105. The process 300 initiates with the monitoring of Fibre Channel paths in the process element 301. From there, the Fibre Channel port speeds of the Fibre Channel paths and certain Fibre Channel traffic characteristics are determined in the process elements 302 and 303, respectively. For example, each of the Fibre Channel paths is generally configured with a transmit port and a receive port for Fibre Channel traffic. Each of these ports is generally configured to convey data at a particular speed (e.g., 1, 2, 4, 8, 10, 12 gigabits). A host bus adapter (e.g., host bus adapter 103) connected to the Fibre Channel paths may be configured with hardware and/or software for detecting the port speeds of the Fibre Channel paths. Additionally, the host bus adapter may also detect the size of data being conveyed across the Fibre Channel ports. With this information in hand, the host bus adapter may normalize the Fibre Channel port speeds such that each operable port conveys data at the lowest available port speed, as described hereinabove.

From there, the host bus adapter may filter the fiber Channel traffic, in the process element 305, to smooth statistical abnormalities in the fiber Channel traffic. For example, during the normal course of conveyance of fiber Channel traffic over the fiber Channel ports, certain ports may experience brief periods of over utilization and/or underutilization. A filter may be configured to smooth these anomalies such that the anomalies do not affect the adaptive selection of the ports for subsequent routing. In this regard, the filter may output information that is used to generate a real-time statistical model of the fiber Channel traffic in the process element 306 that is in turn used to update the fiber Channel path list in the process element 307. That is, a path selection list of the Fibre Channel paths and their respective ports may be generated and updated according to the real time statistical model of the Fibre Channel traffic being conveyed. Thereafter, when a Fibre Channel traffic request is received by the host bus adapter, path selection logic may review the path selection list and determine a suitable path/port for the pending traffic (e.g., the process elements 308 and 309). For example, the Fibre Channel traffic request may include header information that indicates the amount of Fibre Channel traffic to be transferred. A detector, such as the detector 101 above, may analyze the header information to ascertain the amount of pending Fibre Channel traffic such for use in the path selection process. The process 300 may update on a periodic basis (e.g., once per second). Accordingly, the process element 309 may return to the process 301 to refresh the path list.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Fibre Channel load balancer coupled to a plurality of Fibre Channel paths, the Fibre Channel load balancer comprising:
    a detector operable to monitor Fibre Channel traffic across the Fibre Channel paths and identify Fibre Channel traffic characteristics and Fibre Channel path characteristics; and
    path selection logic operable to adaptively select the Fibre Channel paths for routing the Fibre Channel traffic based on the Fibre Channel traffic characteristics and the Fibre Channel path characteristics to balance the Fibre Channel traffic across the Fibre Channel paths,
    wherein the path selection logic is further operable to periodically update a list of the Fibre Channel paths from which the path selection logic adaptively selects the Fibre Channel paths to balance the Fibre Channel traffic across the Fibre Channel paths,
    wherein the Fibre Channel path characteristics comprise speeds of the Fibre Channel paths, and
    wherein the Fibre Channel load balancer further comprises a filter operable to filter the Fibre Channel traffic and generate a statistical model of the Fibre Channel traffic for input to the path selection logic, wherein the path selection logic is further operable to adaptively select the Fibre Channel paths for routing the Fibre Channel traffic based on the generated statistical model,
    wherein the filter is communicatively coupled to a port speed normalizer that is used to normalize the speeds of the Fibre Channel paths and wherein the filter is further operable to perform a moving exponential average of the Fibre Channel traffic after normalizing the speeds.

2. The Fibre Channel load balancer of claim 1, wherein the Fibre Channel traffic comprises header information indicating a size of the Fibre Channel traffic and wherein the detector is further operable to detect the size of the Fibre Channel traffic for use by the path selection logic.

3. The Fibre Channel load balancer of claim 1, wherein the Fibre Channel traffic comprises both received and transmitted Fibre Channel traffic and wherein the detector is further operable to integrate said received and transmitted Fibre Channel traffic for use by the path selection logic in adaptively selecting the Fibre Channel paths.

4. A method of routing Fibre Channel traffic, the method comprising:
    monitoring Fibre Channel traffic over a plurality of Fibre Channel paths;
    detecting characteristics of the Fibre Channel traffic;
    adaptively routing the Fibre Channel traffic over the Fibre Channel paths based on the Fibre Channel traffic characteristics, wherein the traffic characteristics comprise speeds of the Fibre Channel paths,
    normalizing the speeds of the Fibre Channel paths; and
    filtering the Fibre Channel traffic of the Fibre Channel paths to generate a statistical model of the Fibre Channel traffic for use in adaptively routing the Fibre Channel traffic, wherein the filtering comprises performing a moving exponential average of the Fibre Channel traffic after normalizing the speeds of the Fibre Channel paths.

5. The method of claim 4, wherein each Fibre Channel path includes a transmit port and a receive port and wherein the method further comprises detecting the size of transmitted Fibre Channel traffic for the transmit ports and received Fibre Channel traffic for the receive ports.

6. The method of claim 5, further comprising integrating said received and transmitted Fibre Channel traffic and normalizing speeds of the transmit and receive ports of the Fibre Channel paths to adaptively route the transmitted and received Fibre Channel traffic across the Fibre Channel paths.

7. The method of claim 4, wherein adaptively routing the Fibre Channel traffic over the Fibre Channel paths comprises generating a path selection list and updating said list based on real time Fibre Channel traffic characteristics.

8. A non-transitory computer program product comprising a computer readable medium embodying a computer readable program for balancing Fibre Channel traffic across a plurality of Fibre Channel paths, wherein the computer readable program when executed on a computing device causes the computing device to perform the steps of:
    monitoring the Fibre Channel traffic over the Fibre Channel paths;
    detecting sizes of the Fibre Channel traffic;
    detecting speeds of the Fibre Channel paths;
    normalizing the speeds of the Fibre Channel paths;
    adaptively routing the Fibre Channel traffic over the Fibre Channel paths based on the Fibre Channel traffic sizes and the speeds; and filtering the Fibre Channel traffic of the Fibre Channel paths to generate a statistical model of the Fibre Channel traffic for use in adaptively routing the Fibre Channel traffic, wherein the filtering comprises performing a moving exponential average of the Fibre Channel traffic after normalizing the speeds of the Fibre Channel paths.

9. The computer program product of claim 8, wherein each Fibre Channel path includes a transmit port and a receive port and wherein the computer program product further comprises the step of detecting the size of transmitted Fibre Channel traffic for the transmit ports and received Fibre Channel traffic for the receive ports.

10. The computer program product of claim 9, further the step of comprising integrating said received and transmitted Fibre Channel traffic.

11. The computer program product of claim 8, wherein the step of adaptively routing the Fibre Channel traffic over the Fibre Channel paths comprises the step of generating a path selection list and updating said list based on real time Fibre Channel traffic characteristics.

* * * * *